United States Patent
Kim

(10) Patent No.: US 9,659,471 B2
(45) Date of Patent: May 23, 2017

(54) ANTI-THEFT APPARATUS FOR MOBILE DEVICE

(71) Applicant: Kum Oh Electronics CO., LTD., Bucheon-si (KR)

(72) Inventor: Ki Sang Kim, Bucheon-si (KR)

(73) Assignee: KUM OH ELECTRONICS CO., LTD., Bucheon-si (KR)

( * ) Notice: Subject to any disclaimer, the term of this patent is extended or adjusted under 35 U.S.C. 154(b) by 0 days.

(21) Appl. No.: 15/181,847

(22) Filed: Jun. 14, 2016

(65) Prior Publication Data

US 2017/0018156 A1 Jan. 19, 2017

(30) Foreign Application Priority Data

Jul. 15, 2015 (KR) ........................ 10-2015-0100350

(51) Int. Cl.
*G08B 21/00* (2006.01)
*G08B 13/14* (2006.01)
*H02J 7/00* (2006.01)
*H04M 1/06* (2006.01)

(52) U.S. Cl.
CPC ......... *G08B 13/14* (2013.01); *G08B 13/1409* (2013.01); *H02J 7/0042* (2013.01); *H04M 1/06* (2013.01)

(58) Field of Classification Search
CPC ... G08B 13/14; G08B 13/1409; H02J 7/0042; H04M 1/06
USPC ...................................................... 340/568.8
See application file for complete search history.

(56) References Cited

U.S. PATENT DOCUMENTS

| | | | | |
|---|---|---|---|---|
| 5,907,796 A | * | 5/1999 | Matchett | B60R 11/0241 455/126 |
| 9,194,532 B2 | * | 11/2015 | Bisesti | F16M 11/04 |
| 2003/0100341 A1 | * | 5/2003 | Etheridge | H02J 7/0044 455/557 |
| 2009/0079566 A1 | * | 3/2009 | Goldstein | G08B 13/1463 340/568.1 |
| 2012/0293330 A1 | * | 11/2012 | Grant | G08B 13/1427 340/568.8 |
| 2014/0263873 A1 | * | 9/2014 | Kim | F16L 3/1033 248/74.1 |

FOREIGN PATENT DOCUMENTS

| | | |
|---|---|---|
| KR | 1020050007231 | 1/2005 |
| KR | 101303147 | 9/2013 |
| KR | 1020130107782 | 12/2013 |

* cited by examiner

*Primary Examiner* — Mark Rushing
(74) *Attorney, Agent, or Firm* — Cantor Colburn LLP

(57) ABSTRACT

Provided is an anti-theft apparatus for a mobile device that does not disturb a customer when he or she observes and tests a mobile device in a shop and which can be efficiently used with various types of mobile devices. The anti-theft apparatus for a mobile device includes: a base attached to a back surface of a mobile device; a connecting terminal provided in a rear side of the base and connected to an access port of the mobile device; a separation sensor sensing separation of the mobile device from the base; and a distance control unit controlling the distance between the base and the connecting terminal.

6 Claims, 6 Drawing Sheets

ANTI-THEFT APPARATUS FOR MOBILE DEVICE

CROSS REFERENCE TO RELATED APPLICATION

The present application claims priority to Korean Patent Application No. 10-2015-0100350, filed Jul. 15, 2015, the entire contents of which is incorporated herein for all purposes by this reference.

BACKGROUND OF THE INVENTION

Field of the Invention

The present invention relates generally to an anti-theft apparatus for a mobile device. More particularly, the present invention relates to an anti-theft apparatus that does not disturb a customer when he or she observes and tests a mobile device in a shop, and that can be efficiently used with various types of mobile devices.

Description of the Related Art

Generally, according to IT technology developments, various types of mobile devices such as smartphones, notebook computers, navigation devices, digital cameras, etc. are being marketed. However, the price of these mobile devices has also increased due to various state-of-the-art functions being applied thereto.

Accordingly, theft is a concern in shops selling mobile devices. Therefore, such shops devote a lot of effort to theft-prevention of mobile devices that are displayed, particularly in the case when a shop manager is distracted due to dealing with many customers or customer questions.

Thus, many ideas have been proposed for preventing theft of a mobile device displayed in a shop, and the present applicant proposed Korean patent No. 10-1303147, entitled "Locking apparatus for terminal".

Korean Patent No. 10-1303147, entitled "Locking apparatus for terminal" discloses an anti-theft technology for mobile terminals, whereby a mobile terminal is physically locked using a grip, and a controller produces a beep when a connector connected to an access port of the mobile terminal is separated from the access port, thereby electrically preventing theft of the mobile terminal.

However, the locking apparatus for terminal disclosed in Korean Patent No. 10-1303147 has a problem that volume and weight of the grip is considerable, and the grip hinders a visiting customer from observing and testing a mobile terminal in a shop. Further, because manufacturing cost of the locking apparatus is high, shops may be burdened to purchase the locking apparatus by the cost.

The foregoing is intended merely to aid in the understanding of the background of the present invention, and is not intended to mean that the present invention falls within the purview of the related art that is already known to those skilled in the art.

Documents of Related Art

1) Korean Patent Publication No. 10-1303147
2) Korean Patent Publication No. 10-2013-0107782
3) Korean Patent Publication No. 10-2005-0007231

SUMMARY OF THE INVENTION

Accordingly, the present invention has been made keeping in mind the above problems occurring in the related art, and the present invention is intended to propose an anti-theft apparatus for a mobile device, which can efficiently prevent theft of a high price mobile device displayed in a shop, and reduces the size of the anti-theft apparatus so that a customer can efficiently observe and test a mobile device in the shop without being disturbed by the apparatus, and which reduces the manufacturing cost of the anti-theft apparatus, thereby allowing shops to purchase the apparatuses without being burdened by the cost, and which can be efficiently used with various types of mobile devices having different sizes, thereby further reducing the cost burden.

The present invention is also intended to propose an anti-theft apparatus for a mobile device, which is provided with a distance control unit configured to allow the anti-theft apparatus to be used with various types of mobile devices having different sizes, and is provided with an idle-rotation inducing means that can prevent an access terminal from being damaged due to overload applied to the access terminal during distance control performed using the distance control unit.

In order to achieve the above object, according to one aspect of the present invention, there is provided an anti-theft apparatus for a mobile device, the apparatus including: a base attached to the back surface of a mobile device; a connecting terminal provided in the rear side of the base and connected to an access port of the mobile device; a separation sensor provided in the front side of the base, the separation sensor sensing separation of the mobile device from the base; and a distance control unit controlling a distance between the base and the connecting terminal.

The distance control unit may include: an elevating block to which the connecting terminal is mounted; and a distance control pin unit passing the base and screw-coupled to the elevating block, and may further include: an idle-rotation inducing means for inducing the distance control pin unit to idly rotate when a load formed by screw-coupling of the distance control pin unit to the elevating block is over a reference level.

The distance control pin unit may include: a screw pin screw-coupled to the elevating block, and an operation pin passing the base and coupled to the screw pin.

The idle-rotation inducing means may include: a tension wing having a tension so that the diameter thereof is variable, the tension wing being provided on an outer peripheral edge of a lower side of the screw pin; a protruding portion provided on an end of the tension wing by protruding; a receiving groove provided on an inner wall of the operation pin so as to receive the tension wing therein; and a recess continuously provided on a sidewall of the receiving groove so as to allow the protruding portion to sit on the recess, and may further include: an adhesive plate detachably coupled to the front of the base, and attached to the back of the mobile device.

According to the present invention having the above-mentioned configuration, the anti-theft apparatus for a mobile device is a compact apparatus and is attached to the back surface of a mobile device, thereby minimizing the obstruction to a customer's field of vision when the customer visiting a shop observes the mobile device, and minimizing the obstruction to a customer's handling of the mobile device when the customer tests the mobile device with his or her hands. Further, the apparatus of this invention realizes distance control between the base and the connecting terminal so the apparatus can be efficiently used with various types of mobile devices having different sizes. Accordingly, the apparatus of this invention reduces the cost burden to a shop manager that is caused by necessitating the purchase of various anti-theft apparatuses for various kinds of mobile devices. Furthermore, the apparatus of the present invention can prevent, using an idle-rotation inducing means, damage to an access terminal or an access port which may be caused by excessive force when the connecting terminal is overloaded. Thus, the present invention is very useful for the development of the industry.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1A:
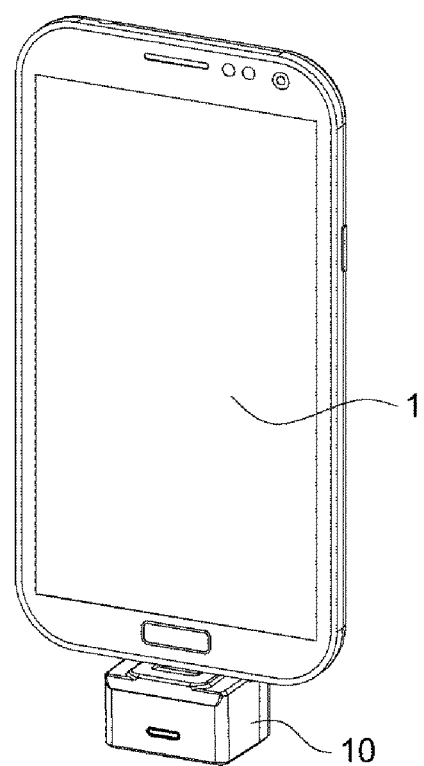
FIGS. 1A and 1B are views showing an anti-theft apparatus for a mobile device according to an embodiment of the present invention, used with a smartphone.

Hereinbelow, an anti-theft apparatus for a mobile device according to an exemplary embodiment of the present invention will be described in detail with reference to the accompanying drawings.

In the following description for the anti-theft apparatus for a mobile device according to the present invention with reference to the accompanying drawings, it should be understood that although the present invention will be described based on aspects (or embodiments), the present invention may be embodied in many different forms and should not be construed as being limited to only the embodiments set forth herein, but should be construed as covering modifications, equivalents or alternatives falling within ideas and technical scopes of the present invention.

In the figures, like reference numerals, particularly, tens and units, or reference numerals having like tens, units and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise.

It will be further understood that the terms "comprises," "comprising", "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Figure 1B:
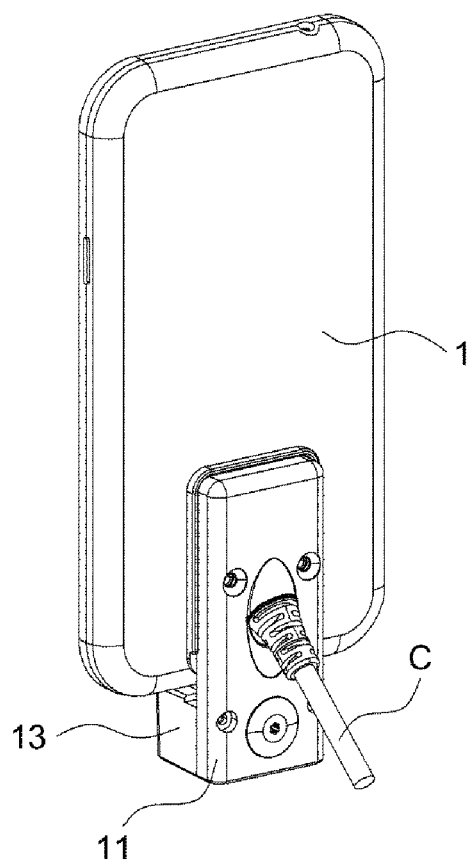
Figure 2A:
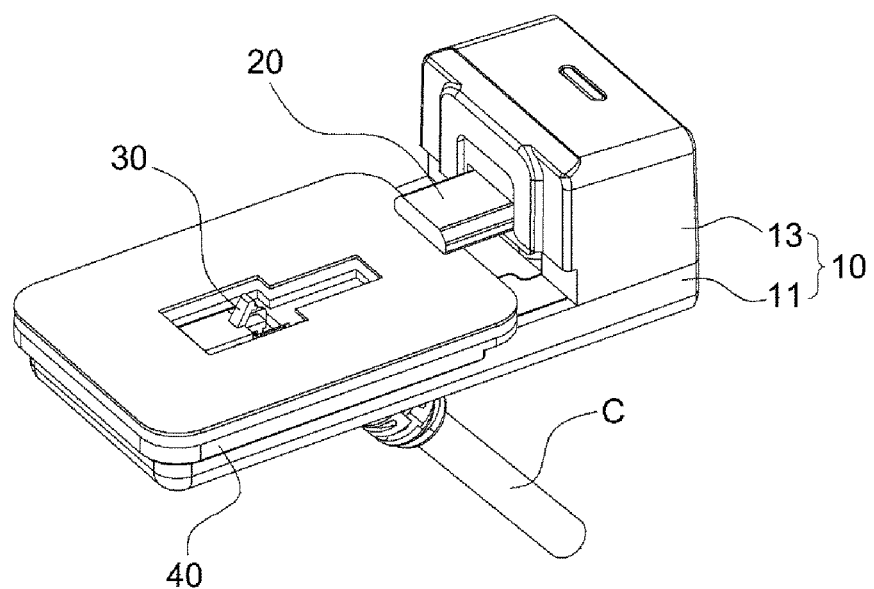
FIGS. 2A and 2B are perspective views showing the anti-theft apparatus according to the present invention.
Figure 2B:
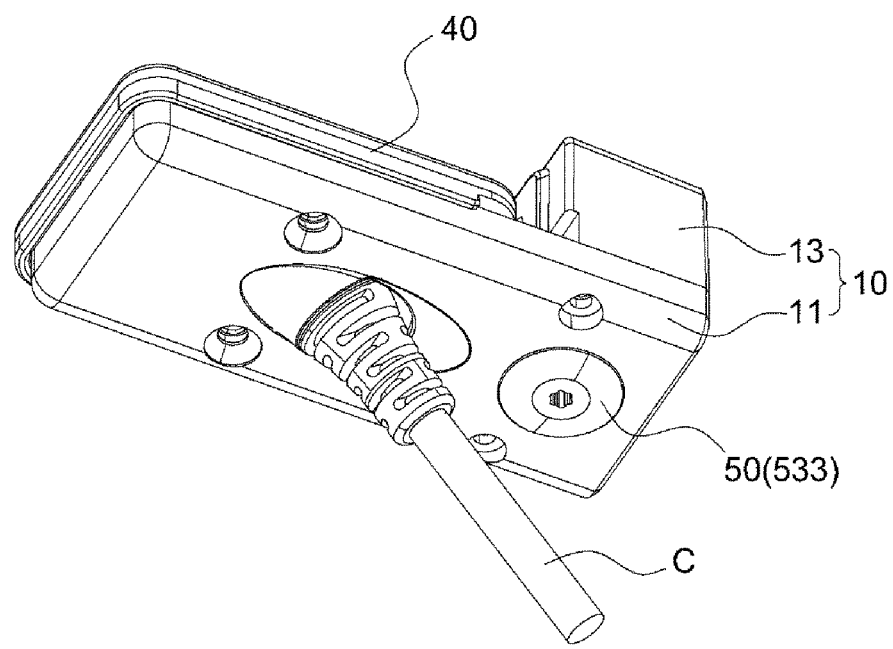
Figure 3:
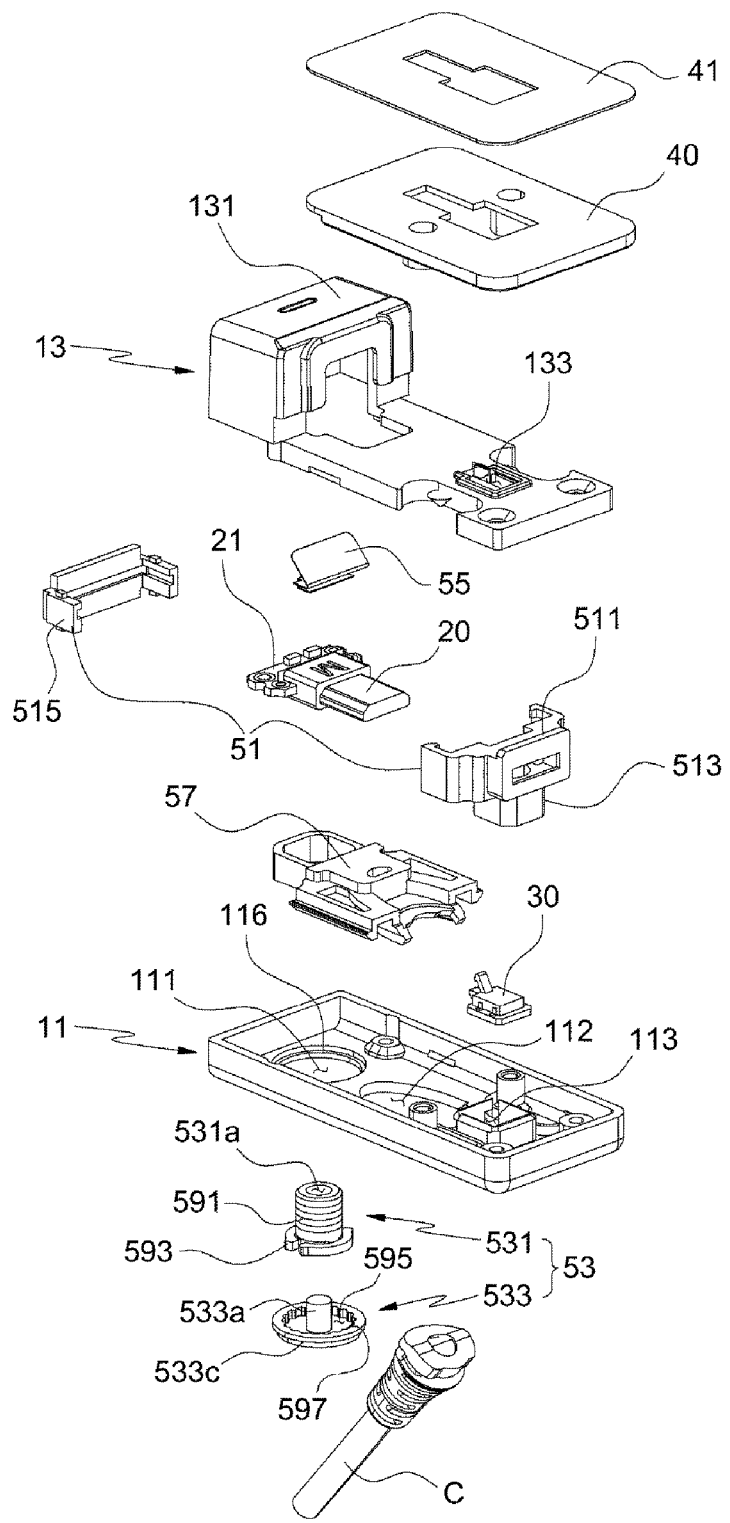
FIG. 3 is an exploded perspective view of FIGS. 2A and 2B.
Figure 4:
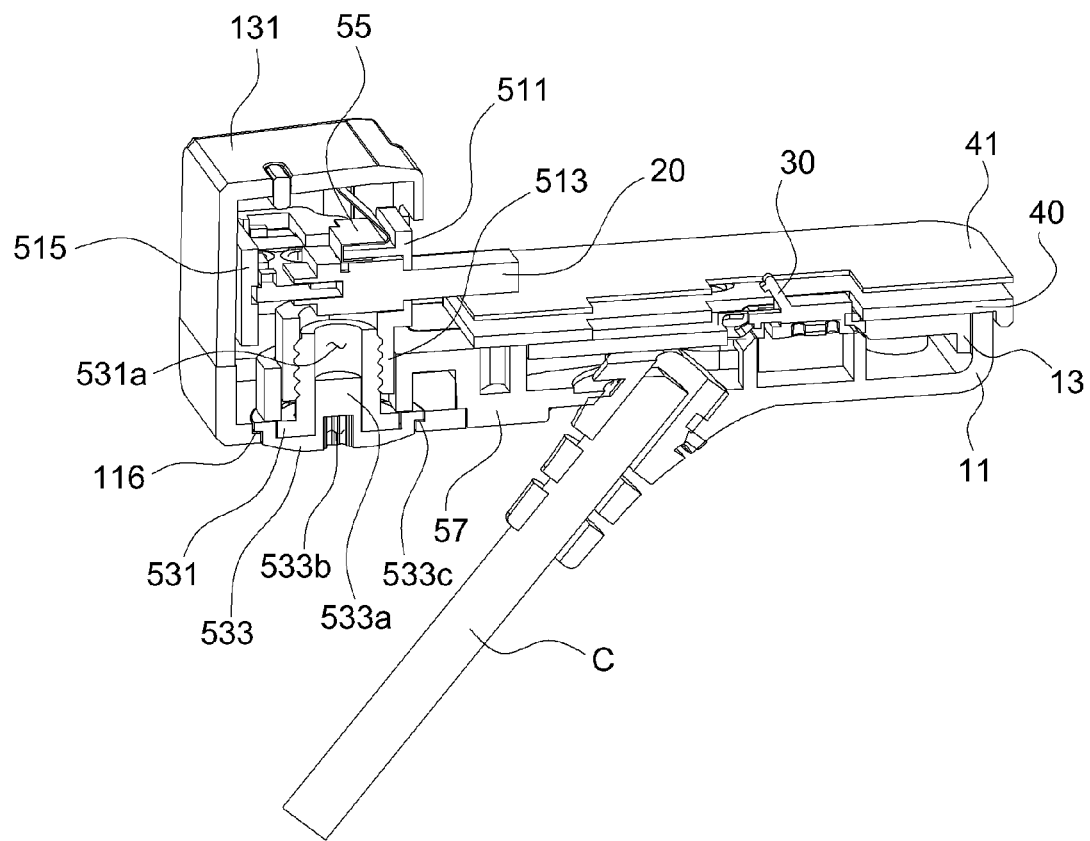
FIG. 4 is a partially cut-away perspective view of FIGS. 2A and 2B.

As shown in FIGS. 1A to 4, the anti-theft apparatus for a mobile device according to an exemplary embodiment of the present invention comprises a base 10, a connecting terminal 20, a separation sensor 30, an adhesive plate 40, and a distance control unit 50.

The base 10 includes a body 11 and a cover 13 that are assembled with each other to form the base 10.

In a rear side of the body 11, a first through hole 111 is formed, wherein a distance control pin unit 53 of the distance control unit 50 passes through the first through hole 111. A second through hole 112 is formed in a central portion of the body 11, wherein a cable C passes through the second through hole 112. Here, the cable C functions to supply electric power for charging the mobile device and for realizing data communication and sensing operation of the separation sensor 30 via the connecting terminal 20. Further, in a front side of the body 11, a sensor seat 113 is provided to seat the separation sensor 30 therein.

The cover 13 is assembled with the body 11. In a rear side of the cover 13, a protrusion 131 is provided to receive therein an elevating block 51 to which the connecting terminal 20 is mounted, and to define a space for allowing the block 51 to move upward and downward. An exposure hole 133 is formed in a front side of the cover 13 so as to expose the separation sensor 30 to the outside.

The connecting terminal 20 is connected to an access port provided in the mobile device 1. Thus, the connecting terminal 20 can supply charging power to the mobile device 1, or can realize data communication between the mobile device 1 and an external device (e.g.; a controller) connected to the cable C.

The connecting terminal 20 is mounted on the elevating block 51 of the distance control unit 50 and protrudes forward from the protrusion 131 of the cover 13. The connecting terminal 20 is moved upward and downward along with the elevating block 51 so that the distance between the connecting terminal 20 and the cover 13 of the base 10 is controlled.

The adhesive plate 40 is detachably coupled to a surface of the cover 13 of the base 10, and is attached to a back surface of the mobile device 1.

Here, the adhesive plate 40 may be attached to the back surface of the mobile device 1 using a double-sided tape 41.

In the present invention, the adhesive plate 40 may be configured to be not separated from the cover 13. Alternatively, the cover 13 may be directly attached to the back surface of the mobile device 1 using a double-sided tape 41 without separately providing the adhesive plate 40. However, in these cases, when separating the mobile device 1 from the base 10 so as to repair or keep the mobile device 1 in a shop, the base 10 may be damaged. Further, the adhesive force of the double-sided tape 41 may become weak, so the tape 41 may fail to attach a mobile device to the base 10 when attaching the mobile device to the tape 41 again.

However, if the adhesive plate 40 is detachable from the cover 13 of the base 10, the mobile device 1 can be separated from the base 10 by separating the adhesive plate 40 from the base 10, with the adhesive plate 40 being attached to the mobile device 1. Thus, the base 10 is free from being damaged and the adhesive plate 40 is prevented from separation from the mobile device 1 due to adhesive force of the double-sided tape 41 being weakened.

The separation sensor 30 provided in the front side of the cover 13 of the base 10 senses when the base 10 is separated from the mobile device 1 and sends a separation signal to a controller (not shown).

As the separation sensor 30, a pressure sensor that can sense pressure according to whether the mobile device is attached or not may be used.

When a separation signal is output from the separation sensor 30, the controller produces a beep or flashing lights informing a shop manager of an attempted theft of the mobile device.

The distance control unit 50 controls the distance between the base 10 and the connecting terminal 20.

Generally, the access ports of various kinds of mobile devices 1 are standardized, so standard connectors may be used. However, the distance (thickness) from the access port to the back surface of the mobile device 1 varies according to models of mobile devices.

For example, in case of a smartphone, which is a typical mobile device 1 widely used in recent years, the distance between the access port and the back surface of the mobile device 1 varies according to model and manufacturer.

Accordingly, in a shop displaying various types of mobile devices 1, the provision of anti-theft apparatuses matching the various types of mobile devices creates cost burdens for a shop manager, and inconvenience is caused by requiring the individual confirmation of a mobile device 1 and a specific anti-theft apparatus.

The anti-theft apparatus of the present invention solves the above-mentioned problems by using the distance control unit that can variably control the distance between the connecting terminal 20 and the base 10 and thus allows the anti-theft apparatus to be used with a mobile device 1 regardless of the type of the device.

The distance control unit 50 includes the elevating block 51, the distance control pin unit 53, an elastic plate 55, a stopper 57, and an idle-rotation inducing means 59.

In the elevating block 51, the connecting terminal 20 is mounted such that the terminal 20 protrudes forward from the block 51, with a screw part 513 protruding downward from the block 51, wherein the distance control pin unit 53 is screw-coupled to the screw part 513.

The elevating block 51 includes: a rear block 515 into which an edge of a circuit board 21 electrically connected to the rear end of the connecting terminal 20 is slidably inserted; and a front block 511 that is combined with the rear block 515 by a hooked combination method and in which the connecting terminal 20 is installed to protrude forward. The screw part 513 is formed in the lower part of the front block 511.

The distance control pin unit 53 is coupled to the body 11 of the base 10 by passing therethrough. The distance control pin unit 53 is screw-coupled to the screw part 513 of the elevating block 51 inside the base 10, thus moving the elevating block 51 upward and downward. In other words, the distance control pin unit 53 controls the distance between the connecting terminal 20 provided in the elevating block 51 and the cover 13 of the base 10 by moving the elevating block 51 upward and downward.

The distance control pin unit 53 includes: a screw pin 531 screw-coupled to the screw part 513 of the elevating block 51; and an operation pin 533 passing the body 13 of the base 10 and coupled to the screw pin 531, and configured to allow a user to operate the operation pin 533 using a tool such as a driver, a wrench, etc.

To couple the screw pin 531 to the operation pin 533, an inserting hole 531a is formed in the screw pin 531, and an inserting protrusion 533a is formed in the operation pin 533, wherein the inserting protrusion 533a is inserted into the screw inserting hole 531a. Further, a tool hole 533b is formed in the operation pin 533 for allowing a user to operate and rotate the operation pin 533 using a tool such as a driver, a wrench, etc. inserted into the tool hole 533b.

The external threads formed on the outer circumferential surface of the screw pin 531 are engaged with the internal threads formed on the inner circumferential surface of the screw part 513 of the elevating block 51. Thus, the screw part 513 moves upward or downward along the screw pin 531 in response to a forward rotation or a reverse rotation of the screw pin 531.

To allow the screw part 531 to stably control the position of the elevating block 51 (e.g. the connecting terminal 20) by moving along the screw pin 531, it is desirable that the distance control pin unit 53 rotates in a forward direction or a reverse direction at a predetermined position.

Further, to allow the distance operation pin unit 53 to rotate at the predetermined position, a step 116 is formed along the edge of the first through hole 111 of the body 11 of the base 10, and a seating protrusion 533c is formed along the edge of the operation pin 533, wherein the seating protrusion 533c is engaged with the step 116 by being seated thereon. Further, a stopper 57 is provided in the base 10 for pressing the edge of an upper surface of the operation pin 533, thereby preventing the operation pin 533 from leaving the predetermined position.

The elastic plate 55 elastically biases the elevating block 51 at a position above the elevating block 51, thereby allowing the elevating block 51 to more stably move upward and downward at the predetermined position.

The elastic plate 55, of which the lower side is formed in a U-shape, is inserted into the upper part of the front block 511 of the elevating block by a male and female coupling method. The upper side of the elastic plate 55 is inclined diagonally, and elastically supports the inner wall of the upper side of the protrusion 131 of the cover 13, thereby continuously pushing the elevating block 51 toward the distance control pin unit 53, and allowing the elevating block 51 (e.g. the connecting terminal 20) to move upward and downward without shaking at the predetermined position.

A range of upward and downward movement of the elevating block 51 in the protrusion 131 of the base 10 is limited. However, if the distance control pin unit 53 further rotates even after reaching the limitation range, the distance control pin unit 53, the elevating block 51 or the base 10 coupled to these elements may be excessively loaded to be damaged.

Accordingly, when a load applied to the distance control pin unit 53 in a state in which the distance control pin unit 53 is screw-coupled to the elevating block 51 (e.g., during upward or downward movement of the elevating block 51 by forward or reverse rotation of the distance control pin unit 53) exceeds a reference level, the idle-rotation inducing means 59 rotates only the distance control pin unit 53. In other words, in this case, the idle-rotation inducing means 59 controls the distance control pin unit 53 to idly rotate at the predetermined position, without allowing upward or downward movement of the elevating block 51.

To realize the idle rotation of the distance control pin unit 53, the pin unit 53 is provided with the screw pin 531 and the operation pin 533, and the idle-rotation inducing means 59 controls the distance control pin unit 53 such that when the load caused by the screw-coupling is equal to or less than the reference level, thus the operation pin 533 rotates together with the screw pin 531. However, when the load caused by the screw-coupling exceeds the reference level, only the operation pin 533 rotates while the screw pin 531 is in an immobile state.

The idle-rotation inducing means 59 includes: a tension wing 591 having a tension so that the diameter thereof is variable, the tension wing 591 being provided on an outer peripheral edge of a lower side of the screw pin; a protruding portion 593 provided on the end of the tension wing 591 by protruding; a receiving groove 595 provided on the inner wall of the operation pin so as to receive the tension wing 59 therein; and a recess 597 continuously provided on the sidewall of the receiving grove 595 so as to allow the protruding portion 593 to sit on the recess 597.

The protruding portion 593 of the screw pin 531 sits on the recess 597 of the operation pin 533 so that when the operation pin 533 rotates by the manipulation of a user, the screw pin 531 rotates together therewith.

When the operation pin 533 and the screw pin 531 rotate, the elevating block 51 moves upward or downward. When the elevating block 51 reaches an allowable limit of the upward and downward movement, the elevating block 51 is blocked so that the movement of the block 51 is stopped. When the elevating block 51 is blocked and stopped, the rotation of the screw pin 531 is disturbed, so the load applied to the screw pin 531 is increased. When the load applied to the screw pin 531 exceeds the reference level, the diameter of the tension wing 591 is reduced and the protruding portion 593 escapes from the recess 597.

As described above, when the elevating block 51 reaches a limit position, the idle-rotation inducing means 59 controls the distance control pin unit 53 such that only the operation pin 533 rotates, thereby preventing the elevating block 51 or the distance control pin unit 53 from being overloaded or damaged. Further, a user can sense whether only the operation pin 533 rotates or both the operation pin 533 and the screw pin 531 rotate together, thereby preventing from unnecessary operation of the distance control pin unit 53.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An anti-theft apparatus for a mobile device, the apparatus comprising:
    a base attached to a back surface of a mobile device;
    a connecting terminal provided in a rear side of the base and connected to an access port of the mobile device;
    a separation sensor provided in a front side of the base, the separation sensor sensing separation of the mobile device from the base; and
    a distance control unit including: an elevating block to which the connecting terminal is mounted, and a distance control pin unit moving the elevating block upward and downward so that the distance control unit controls a distance between the base and the connecting terminal, wherein;
    the distance control pin unit includes: a screw pin screw-coupled to the elevating block, and an operation pin passing the base and coupled to the screw pin, whereby a step is formed along an edge of a first through hole of the base, a seating protrusion is formed along an edge of the operation pin and engaged with the step to be seated thereon, and a stopper is provided in the base, wherein the stopper presses the edge of an upper surface of the operation pin, thereby preventing the operation pin from leaving a predetermined position thereof and allowing the distance control pin unit to rotate in a forward direction or a reverse direction at a predetermined position thereof, wherein the distance control unit further includes an elastic plate of which a lower side formed in a U-shape is inserted into and coupled to the elevating block by a male and female coupling method, and an upper side is inclined diagonally and elastically supports an inner wall of an upper side of a cover of the base, thereby continuously pushing the elevating block toward the distance control pin unit, and allowing the elevating block to move upward or downward without shaking at a predetermined position.

2. The apparatus of claim 1, wherein the distance control unit further includes:
    an idle-rotation inducing means for inducing the distance control pin unit to idly rotate when a load formed by screw-coupling of the distance control pin unit to the elevating block is over a reference level.

3. The apparatus of claim 2, wherein the idle-rotation inducing means includes:
    a tension wing having a tension so that a diameter thereof is variable, the tension wing being provided on an outer peripheral edge of a lower side of the screw pin,
    a protruding portion provided on an end of the tension wing by protruding,
    a receiving groove provided on an inner wall of the operation pin so as to receive the tension wing therein, and
    a recess continuously provided on a sidewall of the receiving groove so as to allow the protruding portion to sit on the recess.

4. The apparatus of claim 1, further comprising:
    an adhesive plate detachably coupled to a front of the base, and attached to a back of the mobile device.

5. The apparatus of claim 2, further comprising:
    an adhesive plate detachably coupled to a front of the base, and attached to a back of the mobile device.

6. The apparatus of claim 3, further comprising:
    an adhesive plate detachably coupled to a front of the base, and attached to a back of the mobile device.

* * * * *